United States Patent

[11] 3,621,148

[72] Inventor Keith O. Johnson
Topanga Canyon, Calif.
[21] Appl. No. 758,213
[22] Filed Sept. 9, 1968
[45] Patented Nov. 16, 1971
[73] Assignee MCA Technology, Inc.
Santa Monica, Calif.
Continuation-in-part of application Ser. No. 454,433, May 10, 1965, now abandoned.

[54] ELECTROMAGNETIC RECORD HEAD TRANSDUCER AND SYSTEM
2 Claims, 13 Drawing Figs.

[52] U.S. Cl. .......... 179/100.2 K, 179/100.2 C
[51] Int. Cl. .......... G11b 5/24, G11b 5/44
[50] Field of Search .......... 179/100.2 R, 100.2 C, 100.2 K; 178/6.6 A

[56] References Cited

UNITED STATES PATENTS

| | | | |
|---|---|---|---|
| 2,628,286 | 2/1953 | Rettinger | 179/100.2 |
| 2,634,335 | 4/1953 | Stolaroff | 179/100.2 |
| 2,660,622 | 11/1953 | Field et al. | 179/100.2 |
| 3,026,379 | 3/1962 | Carpenter | 179/100.2 |
| 3,262,124 | 7/1966 | Johnson et al. | 179/100.2 |
| 3,345,468 | 10/1967 | Schlatter | 179/100.2 |

FOREIGN PATENTS

| | | | |
|---|---|---|---|
| 902,063 | 7/1962 | Great Britain | 179/100.2 |

*Primary Examiner*—Bernard Konick
*Assistant Examiner*—J. Russell Goudeau
*Attorney*—Galane, Kleinberg & Morganstern

ABSTRACT: A significant improvement in the dynamic range of the magnetic tape recording process is achieved by the electromagnetic transducer head and system of the present invention. This is achieved by providing a record head with a very high bias flux gradient in its gap, and with a significantly lower intelligence signal flux gradient. The record head gap has a nonmagnetic electrically conductive member therein which is insulated from the core material, and which provides the desired steep gradient for the bias flux. The record head is used in conjunction with an oscillator for supplying a bias signal of frequency of at least 1 MHz. and a record amplifier including circuitry for emphasizing the amplitude of high amplitude signals so as to compensate for magnetic saturation effects in the tape.

INVENTOR.
Keith O. Johnson
BY Keith A. Beecher
ATTORNEYS

INVENTOR.
Keith O. Johnson
Jessup and Beecher
By Keith D. Beecher
ATTORNEYS

INVENTOR.
Keith O. Johnson

By Keith D. Beecher
ATTORNEYS

ELECTROMAGNETIC RECORD HEAD TRANSDUCER AND SYSTEM

CROSS-REFERENCE TO RELATED APPLICATION

This application is a continuation in part of copending application Ser. No. 454,433, filed May 10, 1965 and now abandoned.

BACKGROUND OF THE INVENTION

The present invention relates to magnetic recorders, and it relates more particularly to an improved electromagnetic transducer head and system for recording signals on a magnetic medium with a high signal-to-noise ratio and with low distortion. The invention is particularly concerned with an improved electromagnetic recording head transducer and associated electronic system, by which information may be recorded on a magnetic tape, or equivalent recording medium, with extremely high signal-to-noise ratio, with extended subjective dynamic range, and in a manner such that the recorded information can be subsequently reproduced with a minimum of dropouts and with low distortion.

The invention finds particular utility in the high-quality professional field of audio recording and reproduction. In the system of the invention, the subjective dynamic range is substantially increased, as compared with the usual prior art equipment of the same general type, and by means of simpler and less expensive equipment. This increase in the subjective dynamic range is achieved by a reduction in tape noise, and by a simultaneous increase in the undistorted output from the magnetic tape or equivalent recording medium.

It is well known that the usual prior art electromagnetic recording head, only a small fraction of the total bias flux appears outside the gap for use in the magnetization of the recording medium. Much of the bias input energy to the head results in magnetic flux which crosses the gap in the magnetic core, and which flux is dissipated as eddy current losses in the core. These eddy current losses increase rapidly in the prior art heads, as the frequency of the alternating current bias signal is increased.

The electromagnetic recording head transducer of the present invention, on the other hand, and as mentioned above, includes a nonmagnetic electrically conductive member in the gap, and which is insulated from the core itself. For example, highly conductive copper or silver alloy is suitable for the purpose. The electrically conductive nonmagnetic member in the gap of the head functions as a shorted turn, and eddy currents are established therein. The high eddy current losses produced in the core limits the upper frequency to which the bias signal can be raised. However, in the case of the head of the present invention, the high eddy current losses produced in the core, and in the conductive strip or member in the gap of the core, permits the frequency of the bias signal to be increased to the order, for example, of 4 megacycles, or higher, since the eddy current losses in the core are offset by the vastly increased bias flux produced by the head and which is available for magnetizing the magnet medium. The bias flux is the result of the reaction of the eddy current flux of the gap electrically conductive material with the bias field, and the resulting bias flux can be analogized to a sharply focused beam, for increased penetration of the magnetic medium, and for optimum biasing of all the magnetic particles in the magnetic coating on the medium.

The aforesaid focusing action of the bias flux in the gap gives a high bias flux gradient at the edges of the gap. However, since the signal frequencies are well below the frequency at which eddy currents can be generated in the gap, the intelligence signal flux profile of the head in the system of the invention is similar to that of a conventional head. Therefore, when the magnetic tape is moved across the gap of a recording head constructed in accordance with the concepts of the present invention, it will encounter a rapidly decaying bias field at the trailing edge of the gap, but with a substantially uniform intelligence signal field. This causes the recording process carried out by the head of the invention to approach the ideal anhysteretic process.

The true anhysteretic process is characterized by making a recording by turning off the bias field after the intelligence signal field has been developed. The action of the electromagnetic transducer head of the present invention closely approaches the true anhysteretic recording process, since the rate of collapse of the bias field is much greater than the rate of collapse of the intelligence field as a sampling point on the magnetic moves across the gap and approaches its trailing edge. This is achieved by generating appreciable eddy currents in the aforesaid electrically conductive member in the gap by means of a very high bias frequency.

The resulting eddy current fields oppose the bias field in the gap and provide a disturbed flux profile of the bias field, by which the bias field is "focused" and sharpened out from the gap. The distorted flux profile of the bias field allows deeper flux penetration into the magnetic tape.

However, the field of the longer wavelength and lower frequency intelligence signal is relatively unaffected by the eddy current flux, and the intelligence field will remain essentially constant across the gap, as the bias field rapidly diminishes towards the trailing edge of the gap. This creates a condition whereby the bias field is effectively "turned off" as each elemental area of the tape approaches the trailing edge of the gap, but the intelligence signal field stays on, so as to create a condition approaching the true ideal anhysteretic recording process.

When the improved electromagnetic recording head and system of the present invention is used, the resulting focusing action of the bias field assures that all the magnetic coating of the recording medium will be biased to an optimum extent with no appreciable self-erasing of the higher frequencies of the intelligence signal. The usual distortion which occurs at the higher recording levels is therefore reduced, and the high-frequency saturation level is improved.

The increased penetration of the bias flux into the magnetic medium reduces dropouts materially during subsequent reproduction of the recording. If the usual prior art recorder is operated with no appreciable self-erasure at high frequencies (low bias) the bias flux decreases thereby reducing the sensitivity to signal recording. The magnetic bias flux does not penetrate the magnetic coating on the recording medium to any appreciable extent. Therefore, any flaws or dust on the magnetic recording tape results in a loss of signal and bias flux at the areas of the tape where the flaws occur. This effect is known as "dropout." The deeper penetration of the bias flux in the system of the present invention serves to minimize "-dropouts" during the subsequent reproducing process, by maintaining constant bias. Signal field variations may still occur: however, the constant bias maintains constant sensitivity and dropouts are minimized.

An ancillary advantage of the recording head and system of the present invention is that since most of the bias magnetic flux is forced out of the gap and into the region of the recording medium, the efficiency of the magnetic circuit with respect to the flux forced into the tape is increased, as compared with the bias flux in the usual recording head. The efficiency of the magnetic circuit, insofar as the bias flux is concerned, is therefore relatively high. This means that a magnetic recording head, constructed in accordance with the concepts of the present invention, can be driven at a high alternating current bias level without undue core saturation or electrical losses and fewer volt turns or lower inductance of the windings. This permits better short wavelength resolution without producing distortion in the longer wavelengths in the recording process.

DETAILED DESCRIPTION OF THE ILLUSTRATED EMBODIMENTS

Figures 1, 2:
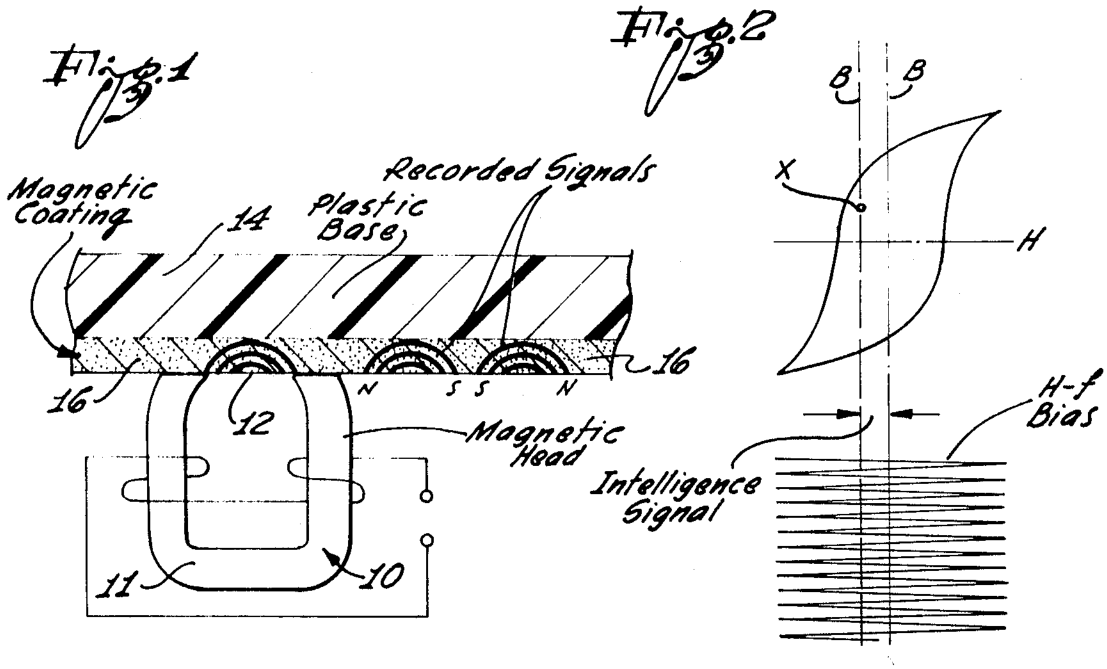
FIG. 1 is a schematic representation showing a prior art record head and associated magnetic tape.
FIG. 2 is a series of curves illustrating the alternating current magnetic recording bias.

A typical apparatus for carrying out the usual magnetic recording process is illustrated in FIG. 1. The recording head 10 includes a magnetic core 11. The core 11 is usually laminated and composed of suitable magnetic core material. It may have any appropriate configuration, and it defines a gap 12. The magnetic medium, in the form, for example, of a tape 14 is drawn across the gap 12, for example, from left to right. The tape 14 has a magnetic coating 16 on its surface adjacent the head 10, the coating being supported on a plastic base, composed, for example, of Mylar. The coating 16 is selectively magnetized by the head 10 as it is drawn across the gap 12.

A winding 18 is wound on the core 11. As will be described, an intelligence signal of relatively low frequency, together with an alternating current high-frequency bias signal are passed through the winding 18. As is well understood in the art, separate windings may be used for the intelligence and bias signals.

The passage of the tape 14 past the gap 12 of the recording head 10 leaves a series of magnetized sections, as illustrated schematically in FIG. 1, and which correspond to the electrical intelligence signal applied to the head at the particular instant the individual sections passed the gap 12.

The magnetic material used in the coating 16 is of necessity nonlinear from a magnetic standpoint because it must possess retentivity to retain the magnetic signal applied to the tape in the recording. The characteristics which depict the magnetomotive force of magnetizing force H produced by the recording head on the magnetic tape, and the residual induction B, after the magnetic tape leaves the head, is shown by the usual B-H hysteresis loop of FIG. 2. The nonlinear portions of the hysteresis loop will produce distortion in the recorded magnetic signals.

Various means have been developed for reducing the effects of this nonlinear characteristic of the head. The system which is universally used in present day sound production is one employing an alternating current bias signal. The bias signal is shown in FIG. 2, and it usually is of a sufficiently high frequency so that it may be added to the audio intelligence signal in the recording head, and there will be no intermodulation of one signal with the other.

An examination of the FIG. 2 will reveal that the high-frequency bias signal will cause the magnetic particles in the coating 16 of the tape 14 to be driven through their hysteresis loops, and when the intelligence signal is added to the high-frequency bias, the resulting shift along the H axis will produce a residual magnetism in the tape, as shown schematically in FIG. 1, and as represented by the point X in FIG. 2. As mentioned above, for ideal anhysteretic recording, it is preferably that the high-frequency bias signal effectively be turned off as each elemental area of the tape reaches a trailing edge of the gap 12. This ideal is approached in the head of the present invention, which provides for a shaping of the bias field in the gap 12, with respect to the intelligence signal field, so that each elemental area of the tape 14 encounters a steep gradient of decay of the bias field as it approaches the trailing edge of the gap 12, whereas the signal intelligence field remains essentially uniform.

In this manner, we have an effective turning off of the AC bias for each elemental area of the tape, so that the magnetizing force H returns to zero.

In the ideal system, each elemental area of the tape should represent a recording which occurred during the maximum effect of the bias flux, and which is capable of drawing the particles to be magnetized through their entire hysteresis loop, as shown in FIG. 2. Then, the bias field should be reduced to zero, so that the recorded output may be independent of the amplitude of the alternating current bias, and when the H magnetizing force returns to zero, due to the particular elemental area moving away from the gap, the residual B should represent the corresponding amplitude of the signal intelligence, compensated for the nonlinearities in the magnetic characteristics of the coating on the tape.

In actuality, however, in the uncompensated prior art magnetic recording system, the bias field drops off towards the trailing edge of the gap at essentially the same rate as the signal intelligence field, and the point at which the recording takes place occurs when the tape is not fully biased magnetically by the bias field. However, any attempt to correct this by increasing the amplitude of the bias field serves merely to shift the recording points past the trailing edge of the gap, and into an area where the signal field is decreasing, so that a low signal-to-noise condition occurs. The signal field cannot be increased, since the saturation on the peaks creates a loss in the high-frequency signals. Moreover, a phase problem occurs in that the recording may take place at a point where the signal has reversed and this creates a tendency for signal erasing at the higher frequencies.

By way of example, if a silver shim having a thickness of 0.4 mil is placed in the gap of a magnetic recording head operating with a bias excitation of 10 MHz., the relatively constant bias field between the two parallel inner pole surfaces is decreased to approximately 0.8 its value (assuming constant current excitation) due to high-frequency eddy currents induced within the conducting silver shim. The fact that the total field intensity within the shim is substantially flat, indicates that the shim produces within itself an approximately constant opposing field. In the 0.4 mil thick case, this opposing field must be approximately 0.2 the magnitude of the exciting field.

Outside of the conducting shim these field lines go in the opposite direction and close on themselves. This appears as a magnetic field due to the uniform pole surfaces (of intensity 0.2 in the 0.4 mil case) along the shim surface between the magnetic pole pieces. Thus the data field is due to the conventional pole configuration along four surfaces, (*a*), (*b*), (*c*) and (*d*), and has the form of FIG. 2A, while the bias field is due to these surfaces plus a superimposed component of 0.20 relative intensity along surfaces (*e*) and (*f*). Surfaces (*e*) and (*f*) alone give rise to field lines in front of the gap of the form shown in FIG. 2B.

The superposition of these has the effect of increasing the field gradient in the area where magnetic recording takes place. This narrows the width of the "critical zone" or the zone in which the actual recording takes place, permitting the recording of shorter wavelengths or higher frequencies (see Camras, P. 41, May–June 1964 IEEE Trans on Audio). It also increases the bias level range over which this steep gradient obtains, giving a longer plateau on the optimum bias level curve.

The steeper gradient occurs only for the high-frequency bias and not for data or audiofrequencies since it depends on high-frequency induced eddy currents. This means that the bias field through the recording zone falls off faster than the data or audio fields. This condition approaches what is known as "anhysteretic" magnetization and offers increased linearity and less distortion.

Figures 2A, 2B, 3:
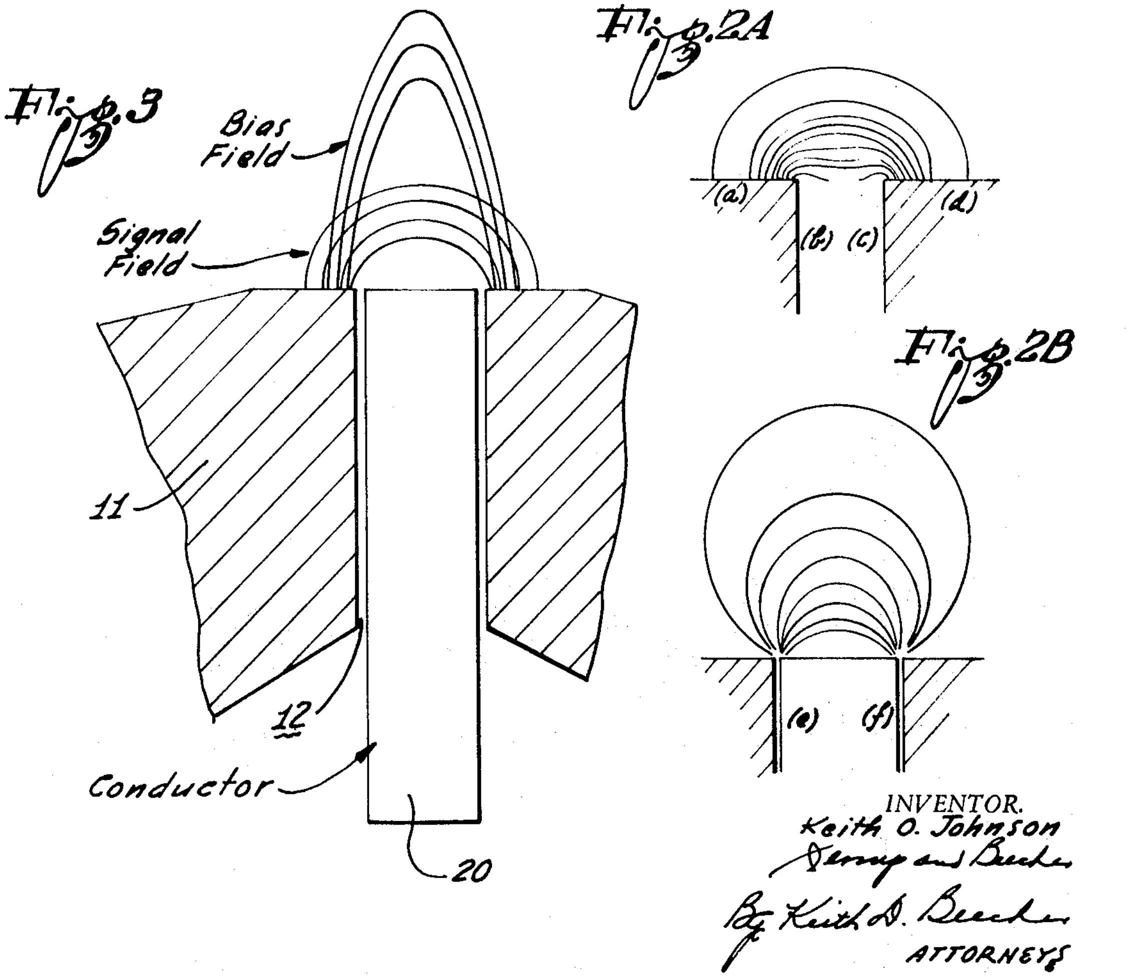
FIG. 2A is a schematic showing of the magnetic field lines in a conventional head pole configuration.
FIG. 2B shows schematically the pattern of field lines radiating from a conducting shim in the gap.
FIG. 3 is a schematic fragmentary representation of a portion of a record head and illustrating the concepts of the present invention.

The basic purpose of the present invention is to generate a bias field which is different from the signal intelligence field. This is achieved, for example, in the schematic representation of FIG. 3 by placing an electrically conductive member 20 in the airgap 12 of the core 10. The representation of FIG. 3 showing the airgap portion of the core in a fragmentary form, and on an enlarged basis with respect to FIG. 1. As shown in FIG. 3, the strip 20 sets up eddy currents in the presence of the high-frequency bias field, but the lower frequency signal intelligence field has little effect in producing eddy currents in the conductive strip 20.

The conductive strip must be insulated from the core 11, so that it can perform properly as a shorted turn, without electrical currents being established throughout the core. This may be achieved by providing a suitable insulation between the conductive strip 20, and the core, or it can be achieved by providing a core of low electrical conductivity. For example, the strip 20 may be formed of silver, gold or copper alloys, as mentioned above; whereas the core 11 may be formed of iron alloys, for example, silicon treated for maximum electrical resistivity. If an insulation is used, it can be applied as a layer or vacuum deposited, and may be a sulfide, silicon monoxide, quartz, condenser paper, and the like.

The eddy current field produced by the shorted turn 20 reacts with the original bias field to produce a distorted bias flux, such as shown in FIG. 3. However, the signal field is not affected to any material extent. Therefore, when the tape moves from the left to right in FIG. 3, as its elemental areas approach the trailing edge of the gap 12, they are first subjected to maximum bias fields so that each particle is driven through its hysteresis loop. At the same time, the signal field is added algebraically to the bias field so that the signal intelligence may be recorded on the tape, the bias field being removed effectively as it rapidly decreases at the trailing edge of the gap, in the signal field being subsequently removed, to leave the proper recording on the tape.

Thus, a considerable improvement in subjective dynamic range is possible by creating a very sharp bias flux gradient from the recording head, as shown in FIG. 3, and by making the signal flux gradient much lower. This action will then more closely approach a true anhysteretic process, since the rate of collapse of the bias field is greater than the collapse of the signal field as the sampling point of the tape moves by the gap. This is achieved, as described above, by generating appreciable eddy currents in an enlarged record gap by means of a very high bias frequency. These gap currents will oppose the driving bias field from the head and will help generate the bias flux distribution shown in FIG. 3.

The eddy current record head described above requires very high bias frequencies to generate significant currents in the gap. If the bias wavelength is much shorter than the tape particle dimensions, the background noise in the 1–5 kilocycle spectrum is only 1 db. above the bulk erased tape noise. A 3 megacycle bias was applied to a record head constructed in accordance with the invention from 0.004 inch alfanol laminations having a 0.002 inch copper gap with a nickel sheathing to prevent pole smearing. Such a head gives less than 1 db. increase background noise for the critical midband frequencies and allows 40 percent more output amplitude with very short wavelengths and thick coatings.

Figure 4:
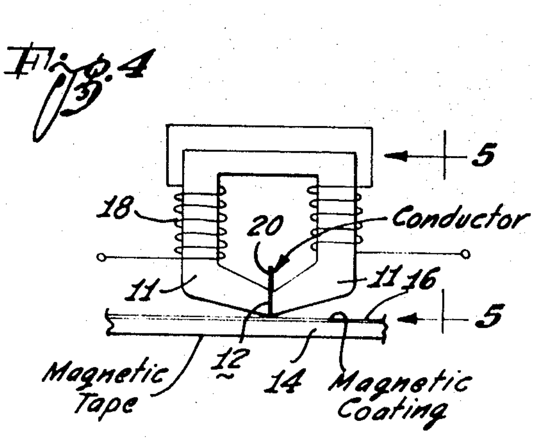
FIG. 4 is a side elevation showing, in schematic form, an electromagnetic transducer head constructed in accordance with the concepts of the invention.
Figure 5:
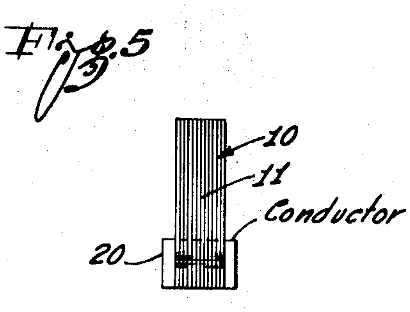
FIG. 5 is a side elevation of the head of FIG. 4, taken substantially on the line 5—5 of FIG. 4.

As shown in FIGS. 4 and 5, the improved magnetic record head 10 of the present invention may include a laminated core 11 of suitable magnetic material, as in the case of the prior art head of FIG. 1. The core 11, as before, has any desired and suitable configuration, and it defines a gap 12. The magnetic medium, in the form, for example, of the magnetic tape 14 is drawn across the core 11 and across the gap 12. The magnetic tape has a magnetic coating 16, as described above, on the surface thereof adjacent to the head 10. This coating is selectively magnetized by the head, in accordance with usual magnetic recording principles. A winding 18 is wound on the core 11. As will be described, the input signal and an alternating current high-frequency bias signal are passed through the winding 18.

A striplike thin electrically conductive nonmagnetic shim member 20 is positioned in the gap 12. This shim member, as described above, is insulated from the core. The shim member may completely fill the gap and extend beyond its periphery, as defined by the portions of the core 11 defining the gap. As shown in FIGS. 4 and 5, the conductive strip 20 extends beyond the sides of the gap, and it also extends beyond the end of the gap remote from the plane traversed by the magnetic tape 14. However, it is not essential for the conductive strip to extend beyond the confines of the gap itself.

Figure 7:
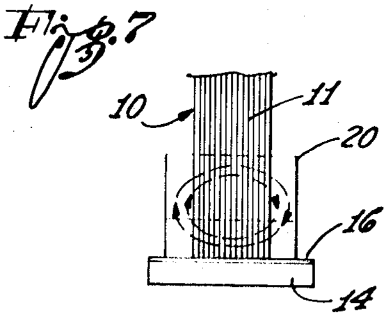
FIG. 7 is a schematic representation of the head of FIG. 4, and illustrating the path of eddy currents in a conductive strip disposed in the gap of the head.

As mentioned above, the electrically conductive strip 20 functions as a shorted turn, and when a high-frequency bias current is passed through the winding 18, eddy currents, such as shown in FIG. 7, are established in the strip. The above-mentioned eddy currents set up magnetic fields which superimpose on the bias magnetic field from the core, and they cause the composite bias field to be displaced out of the gap and into the region of the magnetic tape.

Figure 6:
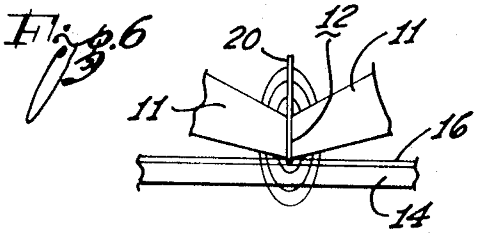
FIG. 6 is a schematic representation of a portion of the head of FIG. 4, and illustrating the path of that part of the magnetic bias flux due to eddy currents flowing in the gap conductor.

As mentioned above, this displacement of the magnetic bias field from the core results in an intense and restricted bias field in the neighborhood of the magnetic tape 14, and one which penetrates deeply into the magnetic tape and through its magnetic coating. When the alternating current bias signal has a frequency in the range, for example, of 4–7 megacycles, or more, the flux distortion is such that an effective "focused" bias field is produced, as shown in FIGS. 3 and 6.

In a constructed embodiment of the invention, for example, more than 70 decibels signal-to-noise ratio was consistently recorded and reproduced, and this was achieved with reduced dropouts, and with significantly less distortion than encountered in equivalent prior art equipment.

Low loss core material was used in the core 11 in a constructed embodiment of the invention to minimize core losses.

Figure 8:
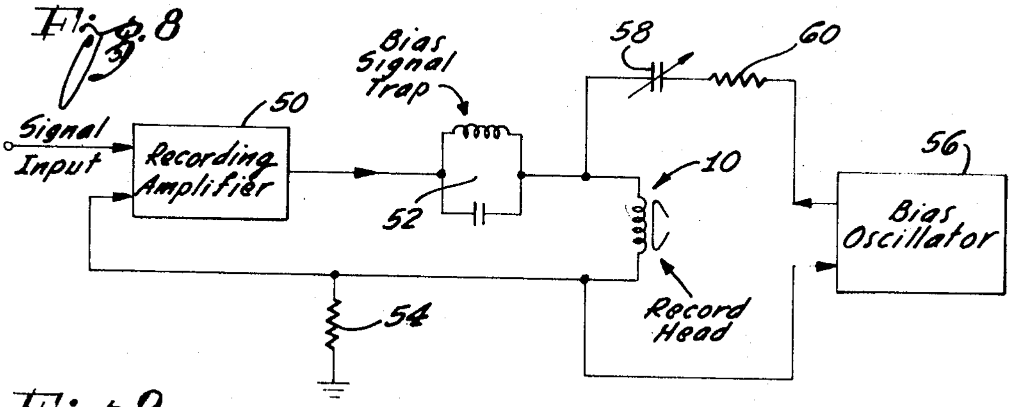
FIG. 8 is a circuit diagram, partly in block form, of a suitable electronic system for use in conjunction with the record head of FIGS. 4 and 5.

As illustrated in the block diagram of FIG. 8, the signal input is introduced to a recording amplifier 50 which is coupled through a usual bias signal trap 52 to the record head 10. A feedback to the recording amplifier 50 is derived across a grounded resistor 54 in the block diagram. A bias oscillator 56 is also provided. This bias oscillator is capable of operating in the megacycle range, and it supplies a high-frequency alternating current bias signal to the record head 10 through, for example, a variable coupling capacitor 58 and series resistor 60. The bias signal has a frequency, for example, in the megacycle range. For example, a 4 megacycle bias signal has been found to operate in the system of the invention with a high degree of satisfaction.

Figure 11:
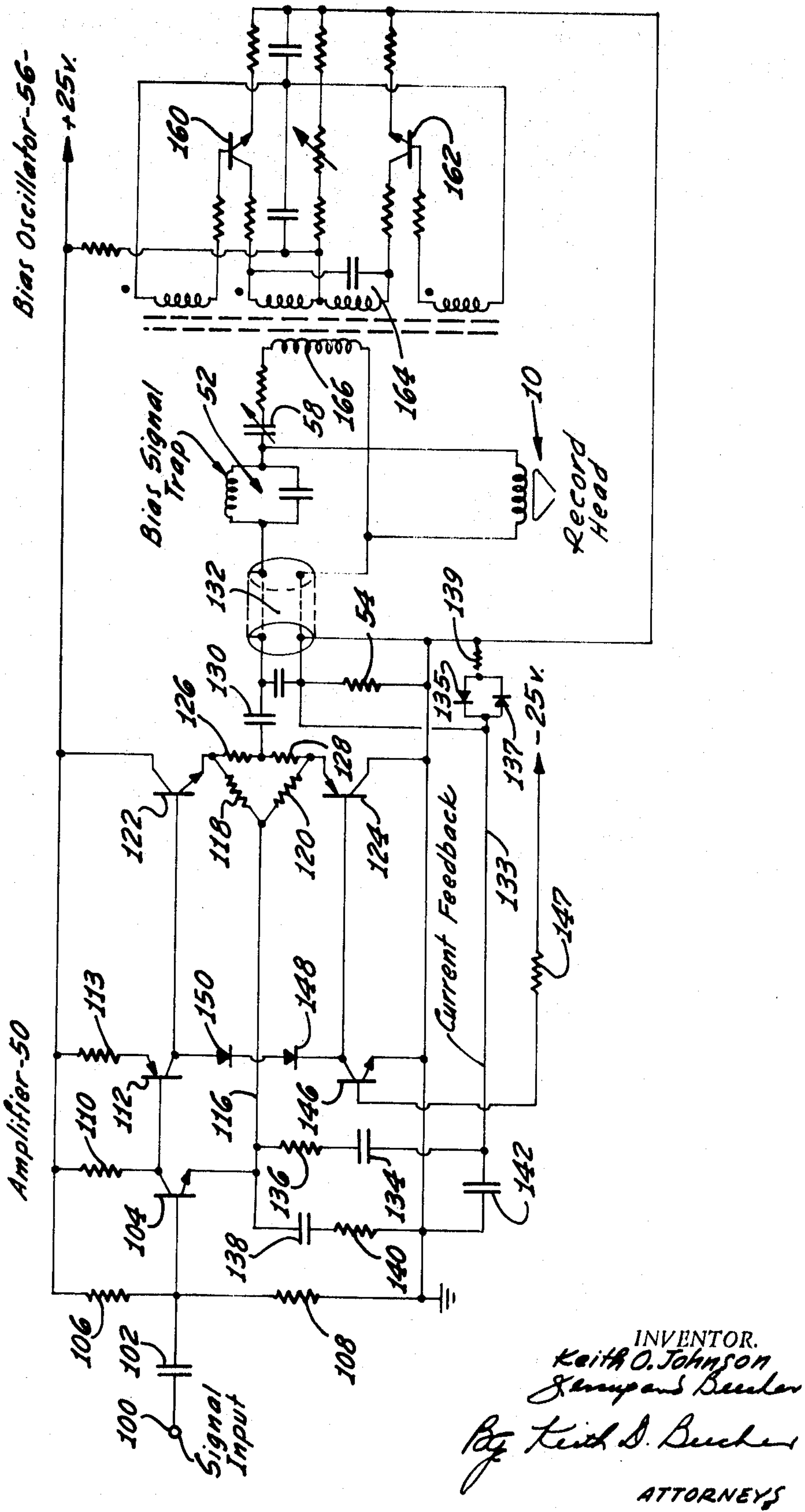
FIG. 11 is a circuit diagram of the system shown in FIG. 8.

The recording amplifier 50, as will be described in conjunction with FIG. 11, is a three-stage direct coupled amplifier. As mentioned above, this amplifier includes a degenerative series negative feedback circuit. The negative feedback circuit samples the recording head current, and this current flows through the resistor 54 to produce a voltage thereacross, the voltage being introduced in degenerative phase to the input of the amplifier 50.

A substantial overload margin is designated into the amplifier so as to eliminate cross modulation to all intents and purposes. In addition, even-order harmonic distortions which occur during tape saturation peaks are also eliminated.

The aforesaid overload margin is obtained in the particular circuit under consideration, by using a class B push-pull output stage in the amplifier to deliver large peak currents to the recording head 10. The amplifier also includes a constant current stage which eliminates crossover distortion from the class B push-pull output stage. The large amount of negative feedback derived across the resistor 54 gives a further reduction in crossover distortion.

The bias oscillator 56 operates, for example, at 4 megacycles, as mentioned above. The output power from the oscillator may be approximately 1 watt, and the efficiency of the oscillator may, for example, be of the order of 60 percent.

The oscillator 56, as will be described in conjunction with FIG. 6, includes two silicon transistors of the medium power radiofrequency type. These transistors carry collector currents, for example, of the order to 1 ampere.

The tuned output circuit of the oscillator has a relatively high-quality factor (Q). It is also desirable that the output from the oscillator should contain a minimum of even-order harmonics. Minimizing even-order harmonics is very desirable in order to reduce tape noise or "hiss" when making recordings. These harmonics are a function of the oscillator design and of the quality factor (Q) of the oscillator tank circuit.

As a consequence, these even-order harmonics are a function of the resistor loading on the tank circuit:

Since:

$$Q=R_p/X_L \qquad (1)$$

Where:

$X_L$ is the inductance reactance of the oscillator tank circuit;

$R_p$ is the shunt load resistance resulting from the oscillator core losses and from the record head loading.

Since the shunt losses are a function of the loading of the record head, it follows that when the head efficiency is improved, the quality factor of the oscillator tank circuit is also improved because the external circuit losses are reduced. As a result of improved bias efficiency at the head, the tape noise can be reduced.

In addition, the higher bias frequency needed to sustain the gap eddy currents prevents bias recordings on the magnetic tape. Since these recordings can induce modulation noise from the tape, this fact also serves further to reduce the resultant background noise.

An automatic gain control loop, not shown, may be included in the oscillator circuit to reduce amplitude drift in the bias signal. This amplitude drift may result from variable loading. Such variable loading will occur, for example, when the individual bias levels of a multichannel head are adjusted.

As shown in FIG. 11, the input signal is introduced to an input terminal 100 which is coupled through a capacitor 102 to the base of an NPN transistor 104. The base of the transistor 104 is biased by means of a pair of resistors 106 and 108 which are connected between the positive terminal of a 25 volt source and ground.

The collector of the transistor 104 is connected to the positive terminal of the 25 volt source through a resistor 110, and it is direct coupled to the base of a PNP transistor 112 through a resistor 114. The emitter of the transistor 104 is connected to a common line 116, and a pair of resistors 118 and 120 connect the common line to the emitter of respective NPN transistors 122 and 124.

The latter transistors are connected as a class B push-pull output stage. Their emitters are connected to a pair of further resistors 126 and 128, the common junction of which is coupled through a capacitor 130, through a transmission line 132, and through the bias signal trap 52, to the head 10.

The current feedback return lead 133 from the record head 10 is connected to the resistor 54, and a negative current feedback is supplied to the transistor 104 through a capacitor 134 and resistor 136. The emitter of the transistor 104 is also connected to a capacitor 138 which, in turn, is connected to a grounded resistor 140. The current feedback lead 133 is also connected to a grounded capacitor 142.

The transistor 112, and a second NPN transistor 146 are connected as a constant current stage, which, as mentioned above, serves to eliminate crossover distortion from the class B output stage of the transistors 122 and 124.

The emitter of the transistor 146 is grounded, and its base is connected through a resistor 147 to the negative terminal of the 25 volt direct voltage source. The collector of the transistor 146 is connected to the base of the transistor 124, and through a pair of diodes 148 and 150 to the collector of the transistor 112.

As mentioned above, the class B push-pull transistors 122 and 124 deliver large peak currents to the head 10. The constant current stage formed by the transistors 112 and 146 serves to eliminate crossover distortion from the class B push-pull output stage, and the negative feedback from the head also serves to provide further reduction in cross distortion.

To help eliminate distortion at the high record levels, two semiconductor diodes 135 and 137 are reversely connected in parallel with one another, and together with a series resistor 139, are connected in shunt with the current feedback path.

The operation is as follows:

As the record current increases, the magnetic tape begins to saturate. As this happens, the diodes 135 and 137 begin to conduct, thereby instantaneously blocking the feedback current and causing the amplifier gain instantaneously to increase. By proper choice of the resistor 54, the diode characteristics can be made to complement the nonlinear record characteristic of the magnetic tape.

Figure 9:
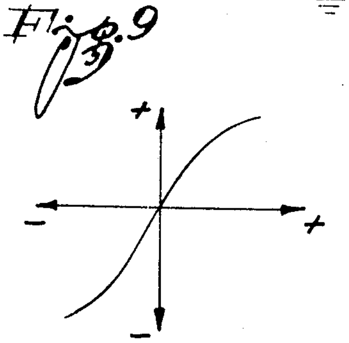
FIGS. 9 and 10 are curves illustrating the manner in which tape distortion is minimized.
Figure 10:
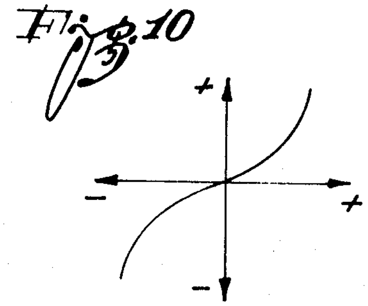

The characteristic curve on FIG. 9 shows the relationship between the amplitude of the input signal to the record head, and the amplitude of the actual recorded signal, due to the magnetic characteristics of the tape. The curve of FIG. 10, on the other hand, shows the characteristics of the recording amplifier 50, due to the diodes 135 and 137.

It will be appreciated that the characteristics of the recording amplifier 50 are such that increased signal amplitudes are emphasized, so as to complement the effective attenuation thereof during the recording process. The result is an essentially linear relationship between the signals actually produced by the recording amplifier 50, and those subsequently reproduced from the tape.

The bias oscillator 56 includes two NPN silicon transistors 160 and 162. These transistors are connected in a usual oscillator circuit which is capable of operating, for example, at a frequency of the order of 4 megacycles.

The tank circuit 164 of the oscillator has a high quality factor. The output signal is derived from the oscillator by means of a winding 166 which is inductively coupled to the inductance portion of the tank circuit 164. The winding 166 is connected through the aforesaid resistor 60 and capacitor 58 to the record head 10, and the high-frequency bias signal is thereby supplied to the record head.

What is claimed is:

1. An electromagnetic transducer head and system combination for recording low-frequency intelligence signals magnetically on a magnetic tape drawn across a surface of said head, said combination including: a magnetic core having a gap therein and defining the aforesaid surface across which the magnetic tape is drawn, and in which the gap extends across said surface and the tape is drawn across said gap from a leading edge to a trailing edge thereof; an electrically conductive nonmagnetic strip member mounted in the gap in said core and filling said gap, with an edge of said strip member extending to said surface across which the magnetic tape is drawn; an electric winding mounted on said core; a high-frequency oscillator coupled to said winding for introducing an alternating current bias signal to said winding of a frequency of the order of at least 1 megacycle to produce a bias magnetic flux across a recording zone at the trailing edge of said gap, said bias flux exhibiting a rapidly decaying characteristic at the trailing edge of said gap; and including a recording signal amplifier coupled to said winding for introducing intelligence signals to said winding, said intelligence signals having frequencies substantially below the frequency of said bias signal and producing signal fluxes in said gap which exhibit a substantially uniform characteristic across said recording zone; said recording signal amplifier including circuitry for emphasizing the amplitude of the high amplitude signals so as to compensate for magnetic saturation effects in the magnetic tape, said alternating current bias signal establishing eddy currents in said conductive strip due to transformer action between said magnetic core and said strip, and said strip acting as a shorted turn for such transformer action, said eddy currents producing an additional bias flux forcing said bias flux out of said gap and focusing the resulting composite bias flux into the region of the magnetic tape drawn across said gap.

2. An electromagnetic transducer head and system combination for recording low!-frequency intelligence signals magnetically on a magnetic tape drawn across a surface of said head, said combination including: a magnetic core having a gap therein and defining the aforesaid surface across which the magnetic tape is drawn, and in which the gap extends across said surface and the tape is drawn across said gap from a leading edge to a trailing edge thereof; an electrically conductive nonmagnetic strip member mounted in the gap in said core and filling said gap, with an edge of said strip member extending to said surface across which the magnetic tape is drawn; an electric winding mounted on said core; a high-frequency oscillator coupled to said winding for introducing an alternating current bias signal to said winding of a frequency of the order of at least one megacycle to produce a bias magnetic flux across a recording zone at the trailing edge of said gap, said bias flux exhibiting a rapidly decaying characteristic at the trailing edge of said gap; and including a recording signal amplifier coupled to said winding for introducing intelligence signals to said winding, said intelligence signals having frequencies substantially below the frequency of said bias signal and producing signal fluxes in said gap which exhibit a substantially uniform characteristic across said recording zone; said recording signal amplifier including a negative current feedback, and circuitry comprising unidirectional devices connected to shunt out said current feedback path for signal amplitudes above a predetermined amplitude threshold, said alternating current bias signal establishing eddy currents in said conductive strip due to transformer action between said magnetic core and said strip, and said strip acting as a shorted turn for such transformer action, said eddy currents producing an additional bias flux forcing said bias flux out of said gap and focusing the resulting composite bias flux into the region of the magnetic tape drawn across said gap.

* * * * *